(12) United States Patent
Liu

(10) Patent No.: US 10,712,653 B2
(45) Date of Patent: Jul. 14, 2020

(54) ETCH VARIATION TOLERANT OPTIMIZATION

(71) Applicant: ASML Netherlands B.V., Veldhoven (NL)

(72) Inventor: Xiaofeng Liu, Campbell, CA (US)

(73) Assignee: ASML Netherlands B.V., Veldhoven (NL)

(*) Notice: Subject to any disclaimer, the term of this patent is extended or adjusted under 35 U.S.C. 154(b) by 0 days.

(21) Appl. No.: 16/258,884

(22) Filed: Jan. 28, 2019

(65) Prior Publication Data

US 2019/0155145 A1     May 23, 2019

Related U.S. Application Data

(63) Continuation of application No. 15/318,940, filed as application No. PCT/EP2015/062135 on Jun. 1, 2015, now Pat. No. 10,191,366.

(60) Provisional application No. 62/017,090, filed on Jun. 25, 2014.

(51) Int. Cl.
| G03F 1/44 | (2012.01) |
|---|---|
| G03F 7/20 | (2006.01) |
| G06F 30/00 | (2020.01) |
| G03F 1/36 | (2012.01) |
| G03F 1/42 | (2012.01) |
| G06F 119/18 | (2020.01) |

(52) U.S. Cl.
CPC .................. *G03F 1/44* (2013.01); *G03F 1/36* (2013.01); *G03F 1/42* (2013.01); *G03F 7/705* (2013.01); *G03F 7/70125* (2013.01); *G03F 7/70433* (2013.01); *G06F 30/00* (2020.01); G06F 2119/18 (2020.01)

(58) Field of Classification Search
CPC ..... G03F 1/36; G03F 1/42; G03F 1/44; G06F 17/50
USPC .................. 430/5, 30; 716/51, 53, 54, 55
See application file for complete search history.

(56) References Cited

U.S. PATENT DOCUMENTS

| 5,229,872 A | 7/1993 | Mumola |
|---|---|---|
| 5,296,891 A | 3/1994 | Vogt et al. |
| 5,523,193 A | 6/1996 | Nelson |
| 5,969,441 A | 10/1999 | Loopstra et al. |
| 6,046,792 A | 4/2000 | Van Der Werf et al. |
| 7,003,758 B2 | 2/2006 | Ye et al. |
| 7,587,704 B2 | 9/2009 | Ye et al. |
| 8,200,468 B2 | 6/2012 | Ye et al. |
| 8,438,508 B2 | 5/2013 | Liu |
| 8,584,056 B2 | 11/2013 | Chen et al. |
| 8,786,824 B2 | 7/2014 | Hansen |
| 8,898,599 B2 | 11/2014 | Liu et al. |
| 9,489,479 B2 | 11/2016 | Liu |
| 9,619,607 B2 | 4/2017 | Tao et al. |
| 9,934,346 B2 | 4/2018 | Hansen |
| 10,191,366 B2 * | 1/2019 | Liu ............... G03F 7/70125 |
| 2005/0076322 A1 | 4/2005 | Ye et al. |
| 2008/0183446 A1 | 7/2008 | Hansen |
| 2009/0157360 A1 | 6/2009 | Ye et al. |
| 2010/0315614 A1 | 12/2010 | Hansen |
| 2011/0099526 A1 | 4/2011 | Liu |
| 2011/0230999 A1 | 9/2011 | Chen et al. |
| 2013/0204594 A1 | 8/2013 | Liu |
| 2013/0326437 A1 | 12/2013 | Liu et al. |
| 2015/0089459 A1 | 3/2015 | Liu |

FOREIGN PATENT DOCUMENTS

| CN | 1133866 | 1/2004 |
|---|---|---|
| CN | 101305320 | 11/2008 |
| JP | 2008-124465 | 5/2008 |
| JP | 2013-015831 | 1/2013 |
| JP | 2013-145880 | 7/2013 |
| KR | 10-2013-0090368 | 8/2013 |
| WO | 2010/059954 | 5/2010 |
| WO | 2013/164187 | 11/2013 |

OTHER PUBLICATIONS

International Search Report and Written Opinion dated Oct. 8, 2015 in corresponding International Patent Application No. PCT/EP2015/062135.

Xiaofeng Liu et al., "EUV source-mask optimization for 7 nm node and beyond," Proc. of SPIE, vol. 9048, pp. 90480Q-1-90480Q-11 (Apr. 17, 2014).

Chris Spence, "Full-Chip Lithography Simulation and Design Analysis—How OPC Is Changing IC Design," Proc. of SPIE, vol. 5751, pp. 1-14 (2005).

Yu Cao et al., "Optimized Hardware and Software for Fast, Full Chip Simulation," Proc. of SPIE, vol. 5754, pp. 407-414 (2005).

(Continued)

*Primary Examiner* — Christopher G Young

(74) *Attorney, Agent, or Firm* — Pillsbury Winthrop Shaw Pittman LLP

(57) ABSTRACT

A method to improve a lithographic process for imaging a portion of a design layout onto a substrate using a lithographic projection apparatus and for transferring the imaged portion of the design layout to the substrate by an etching process, which method includes: determining a value of at least one evaluation point of the lithographic process for each of a plurality of variations of the etching process; computing a multi-variable cost function of a plurality of design variables that are characteristics of the lithographic process, wherein the multi-variable cost function is a function of deviation from the determined values of the at least one evaluation point; and reconfiguring the characteristics of the lithographic process by adjusting the design variables until a termination condition is satisfied. This method may reduce the need of repeated adjustment to the lithographic process when the etching process varies.

25 Claims, 12 Drawing Sheets

(56) References Cited

OTHER PUBLICATIONS

Alan E. Rosenbluth et al., "Optimum mask and source patterns to print a given shape," J. Microlith., Microfab., Microsys., vol. 1, No. 1, pp. 13-30 (Apr. 2002).
Yuri Granik, "Source optimization for image fidelity and throughput," J. Microlith., Microfab., Microsys., vol. 3, No. 4, pp. 509-522 (Oct. 2004).
Robert Socha et al., "Simultaneous Source Mask Optimization (SMO)," Proc. of SPIE, vol. 5853, pp. 180-193 (2005).
Liu, Xiaofeng et al., "EUV source-mask optimization for 7nm node and beyond," Proceedings, of SPIE, vol. 9048, pp. 90480Q-1-90480Q-11 (Apr. 17, 2014).
Chinese Office Action dated Sep. 29, 2017 in corresponding Taiwan Patent Application No. 201580034572.4.
Korean Office Action dated Jan. 29, 2018 in corresponding Korean Patent Application No. 10-2017-7002210.

* cited by examiner

ETCH VARIATION TOLERANT OPTIMIZATION

This application is a continuation of U.S. patent application Ser. No. 15/318,940, filed on Dec. 14, 2016, which is the U.S. national phase entry of PCT patent application no. PCT/EP2015/062135, which was filed on Jun. 1, 2015, which claims the benefit of U.S. provisional patent application No. 62/017,090, which was filed on Jun. 25, 2014. Each of the foregoing applications is incorporated herein in its entirety by reference.

TECHNICAL FIELD

The description herein relates to lithographic apparatuses and processes, and more particularly to a method or tool for optimization of an illumination source and/or patterning device/design layout for use in a lithographic apparatus or process.

BACKGROUND

A lithographic projection apparatus can be used, for example, in the manufacture of integrated circuits (ICs). In such a case, a patterning device (e.g., a mask) may contain or provide a circuit pattern corresponding to an individual layer of the IC ("design layout"), and this circuit pattern can be transferred onto a target portion (e.g. comprising one or more dies) on a substrate (e.g., silicon wafer) that has been coated with a layer of radiation-sensitive material ("resist"), by methods such as irradiating the target portion through the circuit pattern on the patterning device. In general, a single substrate contains a plurality of adjacent target portions to which the circuit pattern is transferred successively by the lithographic projection apparatus, one target portion at a time. In one type of lithographic projection apparatuses, the circuit pattern on the entire patterning device is transferred onto one target portion in one go; such an apparatus is commonly referred to as a wafer stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device are transferred to one target portion progressively. Since, in general, the lithographic projection apparatus will have a magnification factor M (generally <1), the speed F at which the substrate is moved will be a factor M times that at which the projection beam scans the patterning device. More information with regard to lithographic devices as described herein can be gleaned, for example, from U.S. Pat. No. 6,046,792, incorporated herein by reference.

Prior to transferring the circuit pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

As noted, microlithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

SUMMARY

An aspect comprises a method to improve a lithographic process for imaging a portion of a design layout onto a substrate using a lithographic projection apparatus and for transferring the imaged portion of the design layout to the substrate by an etching process, the method comprising: determining a value of at least one evaluation point of the lithographic process for each of a plurality of variations of the etching process; computing a multi-variable cost function of a plurality of design variables that are characteristics of the lithographic process, wherein the multi-variable cost function is a function of a deviation from the determined values of the at least one evaluation point; and reconfiguring the characteristics of the lithographic process by adjusting the design variables until a termination condition is satisfied.

In an embodiment of the method, the deviation is a function of the design variables.

In an embodiment of the method, the deviation is a function of a difference between an actual or simulated value of the at least one evaluation point and the determined value of the at least one evaluation point.

In an embodiment of the method, the evaluation point is selected from a point on a resist image or an aerial image or the design layout, dose, focus, throughput, process window, critical dimension, resist contour distance, worst defect size, and best focus shift.

In an embodiment of the method, the deviation is an edge placement error.

In an embodiment of the method, at least some of the design variables are characteristics of an illumination source, a design layout, projection optics, or a combination thereof.

In an embodiment of the method, the portion of the design layout comprises one or more selected from: an entire design layout, a clip, a section of a design layout that is known to have a critical feature, and/or a section of the design layout where a critical feature has been identified by a pattern selection method.

In an embodiment of the method, the termination condition includes one or more selected from: minimization of the cost function; maximization of the cost function; reaching a preset number of iterations; reaching a value of the cost function equal to or beyond a preset threshold value; reaching a computation time; and/or reaching a value of the cost function within an acceptable error limit.

In an embodiment of the method, iterative reconfiguration is performed without constraints or with constraints dictating the range of at least some of the design variables.

In an embodiment of the method, the constraint includes one or more selected from: a tuning range, a rule governing patterning device manufacturability, and/or interdependence between the design variables.

In an embodiment of the method, determining the value of the at least one evaluation point comprises determining a bias of a pattern in the portion of the design layout.

In an embodiment of the method, the design layout comprises an assist feature, and wherein the assist feature comprises a SRAF (Sub Resolution Assist Feature) and/or PRAF (Printable Resolution Assist Feature).

A further aspect comprises a computer-implemented method to improve a lithographic process for imaging a portion of a design layout onto a substrate using a lithographic projection apparatus and for transferring the imaged portion of the design layout to the substrate by an etching process, the method comprising: determining a value of at least one evaluation point of the lithographic process for each of a plurality of variations of the etching process; computing a multi-variable cost function of a plurality of design variables that are characteristics of the lithographic process, wherein the multi-variable cost function is a function of a deviation from the determined values of the at least one evaluation point, wherein the plurality of design variables comprise the at least one evaluation point; and reconfiguring the characteristics of the lithographic process by adjusting the design variables until a termination condition is satisfied.

In an embodiment of the computer implemented method, the evaluation point is selected from a point on a resist image or an aerial image or the design layout, dose, focus, throughput, process window, critical dimension, resist contour distance, worst defect size, and best focus shift.

In an embodiment of the computer implemented method, at least some of the design variables are characteristics of an illumination source, a design layout, projection optics, or a combination thereof.

In an embodiment of the computer implemented method, the portion of the design layout comprises one or more selected from: an entire design layout, a clip, a section of a design layout that is known to have a critical feature, and/or a section of the design layout where a critical feature has been identified by a pattern selection method.

In an embodiment of the computer implemented method, the termination condition includes one or more selected from: minimization of the cost function; maximization of the cost function; reaching a preset number of iterations; reaching a value of the cost function equal to or beyond a preset threshold value; reaching a computation time; and/or reaching a value of the cost function within an acceptable error limit.

In an embodiment of the computer implemented method, iterative reconfiguration is performed without constraints or with constraints dictating the range of at least some of the design variables.

In an embodiment of the computer implemented method, the constraint includes one or more selected from: a tuning range, a rule governing patterning device manufacturability, and/or interdependence between the design variables.

In an embodiment of the computer implemented method, determining the value of the at least one evaluation point comprises determining a bias of a pattern in the portion of the design layout.

In an embodiment of the computer implemented method, the design layout comprises an assist feature, and wherein the assist feature comprises a SRAF (Sub Resolution Assist Feature) and/or PRAF (Printable Resolution Assist Feature).

A further aspect comprises a computer program product comprising a computer readable medium having instructions recorded thereon, the instructions when executed by a computer implementing the method of any of the previous embodiments.

BRIEF DESCRIPTION OF THE DRAWINGS

The above aspects and other aspects and features will become apparent to those ordinarily skilled in the art upon review of the following description of specific embodiments in conjunction with the accompanying figures, wherein.

DETAILED DESCRIPTION

Figure 1:
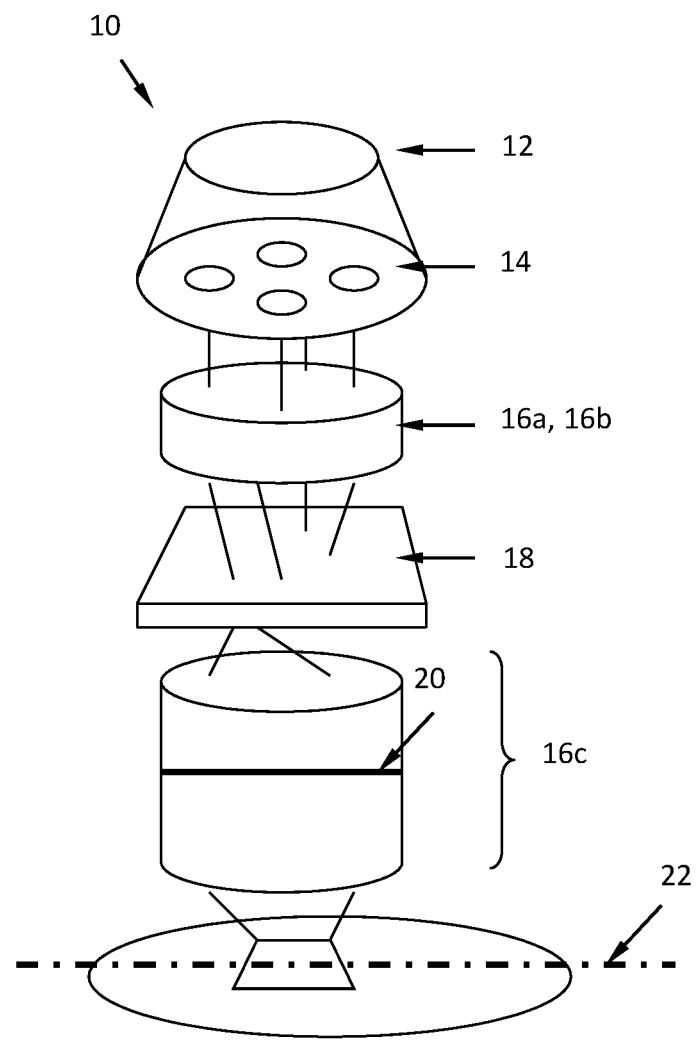
FIG. 1 is a block diagram of various subsystems of a lithography system according to an embodiment.

Embodiments will now be described in detail with reference to the drawings, which are provided as illustrative examples so as to enable those skilled in the art to practice the embodiments. Notably, the figures and examples below are not meant to limit the scope to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the embodiments will be described, and detailed descriptions of other portions of such known components will be omitted so as not to obscure the description of the embodiments. In the present specification, an embodiment showing a singular component should not be considered limiting; rather, the scope is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the scope encompasses present and future known equivalents to the components referred to herein by way of illustration.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1\times\lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or design layout. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

As an example, OPC addresses the fact that the final size and placement of an image of the design layout projected on the substrate will not be identical to, or simply depend only on the size and placement of the design layout on the patterning device. It is noted that the terms "mask", "reticle", "patterning device" are utilized interchangeably herein. Also, person skilled in the art will recognize that, especially in the context of lithography simulation/optimization, the term "mask," "patterning device" and "design layout" can be used interchangeably, as in lithography simulation/optimization, a physical patterning device is not necessarily used but a design layout can be used to represent a physical patterning device. For the small feature sizes and high feature densities present on some design layout, the position of a particular edge of a given feature will be influenced to a certain extent by the presence or absence of other adjacent features. These proximity effects arise from minute amounts of radiation coupled from one feature to another and/or non-geometrical optical effects such as diffraction and interference. Similarly, proximity effects may arise from diffusion and other chemical effects during post-exposure bake (PEB), resist development, and etching that generally follow lithography.

In order to ensure that the projected image of the design layout is in accordance with requirements of a given target circuit design, proximity effects need to be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

Application of model-based OPC to a target design involves good process models and considerable computational resources, given the many millions of features typically present in a chip design. However, applying OPC is generally not an exact science, but an empirical, iterative process that does not always compensate for all possible proximity effect. Therefore, effect of OPC, e.g., design layouts after application of OPC and any other RET, need to be verified by design inspection, i.e. intensive full-chip simulation using calibrated numerical process models, in order to minimize the possibility of design flaws being built into the patterning device pattern. This is driven by the enormous cost of making high-end patterning devices, which run in the multi-million dollar range, as well as by the impact on turn-around time by reworking or repairing actual patterning devices once they have been manufactured.

Both OPC and full-chip RET verification may be based on numerical modeling systems and methods as described, for example in, U.S. Patent Application Publication No. 2005/0076322 and an article titled "Optimized Hardware and Software For Fast, Full Chip Simulation", by Y. Cao et al., Proc. SPIE, Vol. 5754, 405 (2005).

One RET is related to adjustment of the global bias of the design layout. The global bias is the difference between the patterns in the design layout and the patterns intended to print on the substrate. For example, a circular pattern of 25 nm diameter may be printed on the substrate by a 50 nm diameter pattern in the design layout or by a 20 nm diameter pattern in the design layout but with high dose.

In addition to optimization to design layouts or patterning devices (e.g., OPC), the illumination source can also be optimized, either jointly with patterning device optimization or separately, in an effort to improve the overall lithography fidelity. The terms "illumination source" and "source" are used interchangeably in this document. Since the 1990s, many off-axis illumination sources, such as annular, quadrupole, and dipole, have been introduced, and have provided more freedom for OPC design, thereby improving the imaging results, As is known, off-axis illumination is a proven way to resolve fine structures (i.e., target features) contained in the patterning device. However, when compared to a traditional illumination source, an off-axis illumination source usually provides less radiation intensity for the aerial image (AI). Thus, it becomes desirable to attempt to optimize the illumination source to achieve the optimal balance between finer resolution and reduced radiation intensity.

Numerous illumination source optimization approaches can be found, for example, in an article by Rosenbluth et al., titled "Optimum Mask and Source Patterns to Print A Given Shape", Journal of Microlithography, Microfabrication, Microsystems 1(1), pp. 13-20, (2002). The source is partitioned into several regions, each of which corresponds to a certain region of the pupil spectrum. Then, the source distribution is assumed to be uniform in each source region and the brightness of each region is optimized for process window. However, such an assumption that the source distribution is uniform in each source region is not always valid, and as a result the effectiveness of this approach suffers. In another example set forth in an article by Granik, titled "Source Optimization for Image Fidelity and Throughput", Journal of Microlithography, Microfabrication, Microsystems 3(4), pp. 509-522, (2004), several existing source optimization approaches are overviewed and a method based on illuminator pixels is proposed that converts the source optimization problem into a series of non-negative least square optimizations. Though these methods have demonstrated some successes, they typically require multiple complicated iterations to converge. In addition, it may be difficult to determine the appropriate/optimal values for some extra parameters, such as γ in Granik's method, which dictates the trade-off between optimizing the source for substrate image fidelity and the smoothness requirement of the source.

For low $k_1$ photolithography, optimization of both the source and patterning device is useful to ensure a viable process window for projection of critical circuit patterns. Some algorithms (e.g. Socha et. al. Proc. SPIE vol. 5853, 2005, p. 180) discretize illumination into independent source points and mask into diffraction orders in the spatial frequency domain, and separately formulate a cost function (which is defined as a function of selected design variables) based on process window metrics such as exposure latitude which could be predicted by optical imaging models from source point intensities and patterning device diffraction orders. The term "design variables" as used herein comprises a set of parameters of a lithographic projection apparatus, for example, parameters a user of the lithographic projection apparatus can adjust. It should be appreciated that any characteristics of a lithographic projection process, including those of the source, the patterning device, the projection optics, and/or resist characteristics can be among the design variables in the optimization. The cost function is often a non-linear function of the design variables. Then standard optimization techniques are used to minimize the cost function.

Relatedly, the pressure of ever decreasing design rules have driven semiconductor chipmakers to move deeper into the low $k_1$ lithography era with existing 193 nm ArF lithography. Lithography towards lower $k_1$ puts heavy demands on RET, exposure tools, and the need for litho-friendly design. 1.35 ArF hyper numerical aperture (NA) exposure tools may be used in the future. To help ensure that circuit design can be produced on to the substrate with workable process window, source-patterning device optimization (referred to herein as source-mask optimization or SMO) is becoming a significant RET for 2× nm node.

A source and patterning device (design layout) optimization method and system that allows for simultaneous optimization of the source and patterning device using a cost function without constraints and within a practicable amount of time is described in PCT Patent Application No. PCT/US2009/065359, filed on Nov. 20, 2009, and published as PCT Patent Application Publication No. WO 2010/059954, titled "Fast Freeform Source and Mask Co-Optimization Method", which is hereby incorporated by reference in its entirety.

Another source and patterning device optimization method and system that involves optimizing the source by adjusting pixels of the source is described in U.S. patent application Ser. No. 12/813,456, filed on Jun. 10, 2010, and published as U.S. Patent Application Publication No. 2010/0315614, titled "Source-Mask Optimization in Lithographic Apparatus", which is hereby incorporated by reference in its entirety.

Although specific reference may be made in this text to the use of the embodiments in the manufacture of ICs, it should be explicitly understood that the embodiments has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle," "wafer" or "die" in this text should be considered as interchangeable with the more general terms "mask," "substrate" and "target portion," respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

The term "optimizing" and "optimization" as used herein mean adjusting a lithographic projection apparatus such that results and/or processes of lithography have more desirable characteristics, such as higher accuracy of projection of design layouts on a substrate, larger process windows, etc.

Further, the lithographic projection apparatus may be of a type having two or more substrate tables (and/or two or more patterning device tables). In such "multiple stages" devices the additional tables may be used in parallel, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above comprise design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. One of the goals in integrated circuit fabrication is to faithfully reproduce the original circuit design on the substrate (via the patterning device).

The term patterning device as employed in this text may be broadly interpreted as referring to generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The matrix addressing can be performed using suitable electronics. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

As a brief introduction, FIG. 1 illustrates a lithographic projection apparatus 10. Major components are an illumination source 12, which may be a deep-ultraviolet excimer laser source or other type of sources including extreme ultra violet (EUV) sources, illumination optics which define the partial coherence (denoted as sigma) and which may include optics 14, 16a and 16b that shape radiation from the source 12; a patterning device (e.g., a mask or reticle) 18; and transmission optics 16c that project an image of the patterning device pattern onto a substrate plane 22. An adjustable filter or aperture 20 at the pupil plane of the projection optics may restrict the range of beam angles that impinge on the substrate plane 22, where the largest possible angle defines the numerical aperture of the projection optics NA=sin ($\Theta_{max}$).

In an optimization process of a system, a figure of merit of the system can be represented as a cost function. The optimization process boils down to a process of finding a set of parameters (design variables) of the system that minimizes the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations. The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules, and the evaluation points can include physical points on a resist image on a substrate, as well as non-physical characteristics such as dose and focus.

In a lithographic projection apparatus, a source provides illumination (i.e. radiation); projection optics direct and shapes the illumination via a patterning device and onto a substrate. The term "projection optics" is broadly defined here to include any optical component that may alter the wavefront of the radiation beam. For example, projection optics may include at least some of the components 14, 16a, 16b and 16c. An aerial image (AI) is the radiation intensity distribution on the substrate. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. 2009-0157360, the disclosure of which is hereby incorporated by reference in its entirety. The resist model is related only to properties of the resist layer (e.g., effects of chemical processes which occur during exposure, PEB and development). Optical properties of the lithographic projection apparatus (e.g., properties of the source, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the source and the projection optics.

Figure 2:
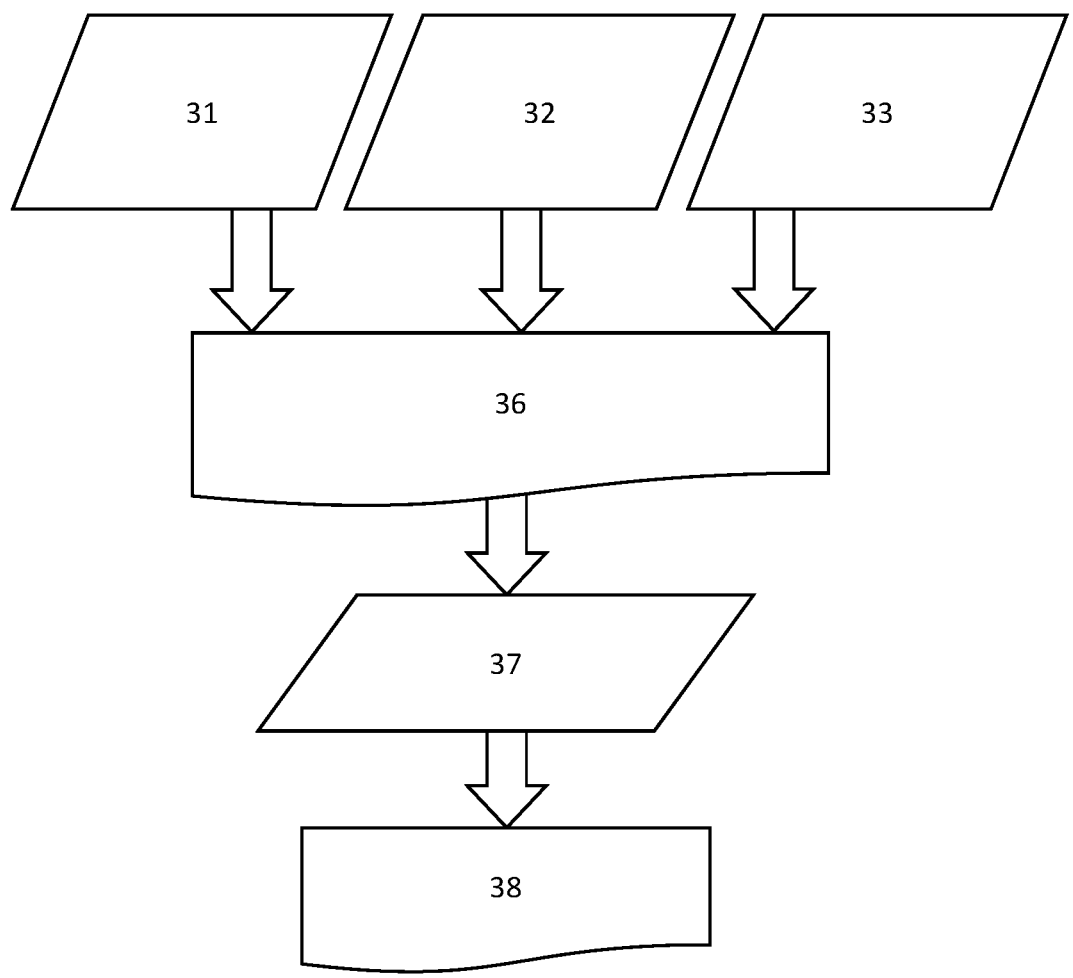
FIG. 2 is a block diagram of simulation models corresponding to the subsystems in FIG. 1.

A flow chart for simulating lithography in a lithographic projection apparatus is illustrated in FIG. 2. A source model 31 represents optical characteristics (including radiation intensity distribution and/or phase distribution) of the source. A projection optics model 32 represents optical characteristics (including changes to the radiation intensity distribution and/or the phase distribution caused by the projection optics) of the projection optics. The projection optics model 32 may include aberration caused by various factors, for example, heating of the components of the projection optics, stress caused by mechanical connections of the components of the projection optics. The source model 31 and the projection optics model 32 can be combined into a transmission cross coefficient (TCC) model. A design layout model 33 represents optical characteristics (including changes to the radiation intensity distribution and/or the phase distribution caused by a given design layout) of a design layout, which is the representation of an arrangement of features of a patterning device. An aerial image 36 can be simulated from the source model 31, the projection optics model 32 and the design layout model 33. A resist image 38 can be simulated from the aerial image 36 using a resist model 37. Simulation of lithography can, for example, predict contours and CDs in the resist image.

More specifically, it is noted that the source model 31 can represent the optical characteristics of the source that include, but not limited to, NA-sigma (σ) settings as well as any particular illumination source shape (e.g. off-axis radiation sources such as annular, quadrupole, and dipole, etc.). The projection optics model 32 can represent the optical characteristics of the of the projection optics that include aberration, distortion, refractive indexes, physical sizes, physical dimensions, absorption, etc. The design layout model 33 can also represent physical properties of a physical patterning device, as described, for example, in U.S. Pat. No. 7,587,704, which is incorporated by reference in its entirety. The objective of the simulation is to accurately predict, for example, edge placements and CDs, which can then be compared against an intended design. The intended design is generally defined as a pre-OPC design layout which can be provided in a standardized digital file format such as GDSII or OASIS or other file format.

From this design layout, one or more portions may be identified, which are referred to as "clips." In a specific embodiment, a set of clips is extracted, which represents the complicated patterns in the design layout (typically about 50 to 1000 clips, although any number of clips may be used). As will be appreciated by those skilled in the art, these patterns or clips represent small portions (i.e. circuits, cells or patterns) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips usually contain one or more test patterns or gauge patterns.

An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

Examples of optimization methods can be found, for example, in U.S. Patent Application Publication No. 2011-0099526, the disclosure of which is hereby incorporated by reference in its entirety.

In one or more embodiments, optimization can be performed using a cost function, such as $$CF(z_1, z_2, \ldots, z_N) = \sum_{p=1}^{P} w_p f_p^2(z_1, z_2, \ldots, z_N) \qquad \text{(Eq. 1)}$$

wherein $(z_1, z_2, \ldots, z_N)$ are N design variables or values thereof; $f_p(z_1, z_2, \ldots, z_N)$ may be a function of a difference between an actual value and an intended value of a characteristic at the p-th evaluation point for a set of values of the design variables of $(z_1, z_2, \ldots, z_N)$. $w_p$ is a weight constant assigned to the p-th evaluation point. An evaluation point or pattern more critical than others can be assigned a higher $w_p$ value. Patterns and/or evaluation points with larger number of occurrences may be assigned a higher $w_p$ value, too. Examples of the evaluation points can be any physical point or pattern on the wafer, or any point on a design layout, or resist image, or aerial image.

The cost function may represent any suitable characteristics of the lithographic projection apparatus or the substrate, for instance, focus, CD, image shift, image distortion, image rotation, etc. For example, the cost function may be a function of one or more of the following lithographic metrics: edge placement error, critical dimension, resist contour distance, worst defect size, stochastic effect, three-dimensional effect of the patterning device, three-dimensional effect of the resist, best focus shift, pupil fill factor, exposure time, and throughput. Since it is the resist image that often dictates the circuit pattern on a substrate, the cost function often includes functions that represent some characteristics of the resist image. For example, $f_p(z_1, z_2, \ldots, z_N)$ of such an evaluation point can be simply a distance between a point in the resist image to an intended position of that point (i.e., edge placement error $EPE_p(z_1, z_2, \ldots, z_N)$). The design variables can be any adjustable parameters such as adjustable parameters of the source, the patterning device, the projection optics, dose, focus, etc. The projection optics may include components collectively called a "wavefront manipulator" that can be used to adjust shapes of a wavefront and intensity distribution and/or phase shift of the irradiation beam. The projection optics can adjust a wavefront and intensity distribution at any location along an optical path of the lithographic projection apparatus, such as before the patterning device, near a pupil plane, near an image plane, near a focal plane. The projection optics can be used to correct or compensate for certain distortions of the wavefront and intensity distribution caused by, for example, the source, the patterning device, temperature variation in the lithographic projection apparatus, and/or thermal expansion of components of the lithographic projection apparatus. Adjusting the wavefront and intensity distribution can change values of the evaluation points and the cost function. Such changes can be simulated from a model or actually measured.

It should be noted that the normal weighted root mean square (RMS) of $f_p(z_1, z_2, \ldots, z_N)$ is defined as $$\sqrt{\frac{1}{P}\sum_{p=1}^{P} w_p f_p^2(z_1, z_2, \ldots, z_N)},$$

therefore, minimizing the weighted RMS of $f_p(z_1, z_2, \ldots, z_N)$ is equivalent to minimizing the cost function $CF(z_1, z_2, \ldots, z_N) = \sum_{p=1}^{P} w_p f_p^2(z_1, z_2, \ldots, z_N)$, defined in Eq. 1. Thus the weighted RMS of $f_p(z_1, z_2, \ldots, z_N)$ and Eq. 1 may be utilized interchangeably for notational simplicity herein.

Further, if the PW (Process Window) is maximized, it is possible to consider the same physical location from different PW conditions as different evaluation points in the cost function in (Eq. 1). For example, if N PW conditions are considered, then the evaluation points can be categorized according to their PW conditions and the cost functions can be written as:

$$\begin{aligned}CF(z_1, z_2, \ldots, z_N) &= \sum_{p=1}^{P} w_p f_p^2(z_1, z_2, \ldots, z_N) \\&= \sum_{u=1}^{U} \sum_{p_u=1}^{P_u} w_{p_u} f_{p_u}^2(z_1, z_2, \ldots, z_N)\end{aligned} \qquad \text{(Eq. 1')}$$

where $f_{p_u}(z_1, z_2, \ldots, z_N)$ is a function of the difference between an actual value and an intended value of the $p_t$-th evaluation point for a set of values of the design variables of $(z_1, z_2, \ldots, z_N)$ under the u-th PW condition $u=1, \ldots, U$. When this difference is the edge placement error (EPE), then minimizing the above cost function is equivalent to minimizing the edge shift under various PW conditions, thus this leads to maximizing the PW. In particular, if the PW also consists of different patterning device bias, then minimizing the above cost function also includes the minimization of MEEF (Mask Error Enhancement Factor), which is defined as the ratio between the wafer EPE and the induced mask edge bias.

The design variables may have constraints, which can be expressed as $(z_1, z_2, \ldots, z_N) \in Z$, where Z is a set of possible values of the design variables. The constraints may represent physical restrictions in a hardware implementation of the lithographic projection apparatus. The constraints may include one or more of: tuning ranges, rules governing patterning device manufacturability, and interdependence between the design variables.

The optimization process therefore is to find a set of values of the design variables, under the constraints $(z_1, z_2, \ldots, z_N) \in Z$, that minimize the cost function, i.e., to find $$(\tilde{z}_1, \tilde{z}_2, \ldots, \tilde{z}_N) = \arg\min_{(z_1, z_2, \ldots, z_N) \in Z} CF(z_1, z_2, \ldots, z_N) = \\ \arg\min_{(z_1, z_2, \ldots, z_N) \in Z} \sum_{p=1}^{P} w_p f_p^2(z_1, z_2, \ldots, z_N) \qquad \text{(Eq. 2)}$$

Figure 3:
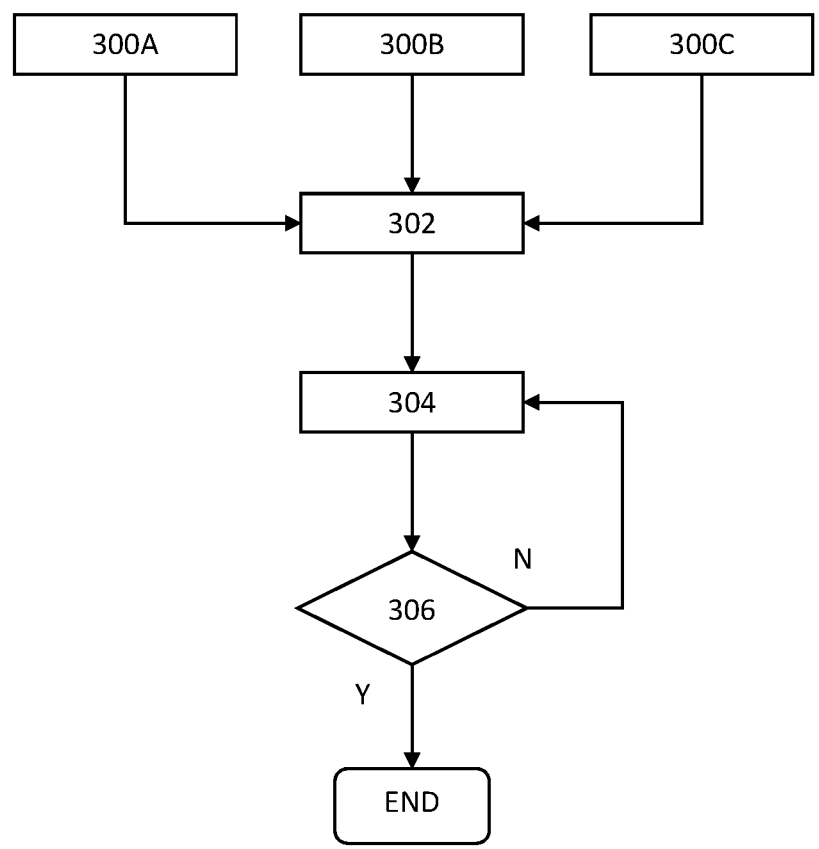
FIG. 3 shows a flow chart of a general method of optimizing the lithography projection apparatus.

A general method of optimizing the lithography projection apparatus, according to an embodiment, is illustrated in FIG. 3. This method comprises a step 302 of defining a multi-variable cost function of a plurality of design variables. The design variables may comprise any suitable combination selected from characteristics of the illumination source (300A) (e.g., pupil fill ratio, namely percentage of radiation of the source that passes through a pupil or aperture), characteristics of the projection optics (300B) and characteristics of the design layout (300C). For example, the design variables may include characteristics of the illumination source (300A) and characteristics of the design layout (300C) (e.g., global bias) but not characteristics of the projection optics (300B), which leads to an SMO. Alternatively, the design variables may include characteristics of the illumination source (300A), characteristics of the projection optics (300B) and characteristics of the design layout (300C), which lead to a source-mask-lens optimization (SMLO). In step 304, the design variables are simultaneously adjusted so that the cost function is moved towards convergence. In step 306, it is determined whether a termination condition is satisfied. The predetermined termination condition may include various possibilities, i.e. the cost function may be minimized or maximized, as required by the numerical technique used, the value of the cost function has been equal to a threshold value or has crossed the threshold value, the value of the cost function has reached within a preset error limit, or a preset number of iteration is reached. If either of the conditions in step 306 is satisfied, the method ends. If none of the conditions in step 306 is satisfied, the step 304 and 306 are iteratively repeated until a desired result is obtained. The optimization does not necessarily lead to a single set of values for the design variables because there may be physical restraints caused by factors such as the pupil fill factor, the resist chemistry, the throughput, etc. The optimization may provide multiple sets of values for the design variables and associated performance characteristics (e.g., the throughput) and allows a user of the lithographic apparatus to pick one or more sets.

In another embodiment, instead of, or in addition to, calculating and/or determining the effect on the optical characteristics of the projection optics, it is envisioned that adjustable optical characteristics of the projection optics can be included in the design variables. Adjustable optical characteristics may include as lens manipulators, the temperature data or signal associated with the temperature data of one or more devices, e.g. heaters, utilized to control the temperature of an optical element of the projection system, Zernike coefficients. The SMO procedure can then be carried out and the design variables, including the adjustable optical characteristics, can be simultaneously adjusted so that the cost function is moved towards convergence.

Figure 4:
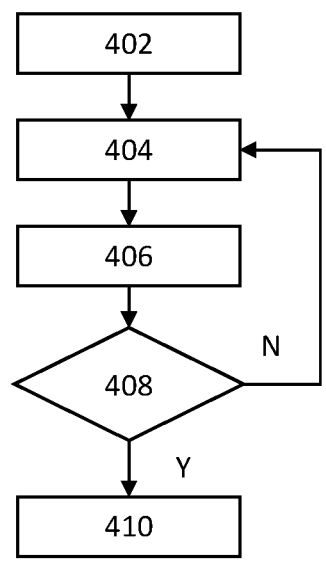
FIG. 4 shows a flow chart of a method of optimizing the lithography projection apparatus where the optimization of all the design variables is executed alternately.

In FIG. 3, the optimization of all the design variables is executed simultaneously. Such flow may be called the simultaneous optimization, joint optimization, or co-optimization. The terms "simultaneous", "simultaneously", "joint" and "jointly" as used herein mean that the design variables of the characteristics of the source, patterning device, projection optics and/or any other design variables, are allowed to change at the same time. Alternatively, the optimization of all the design variables is executed alternately, as illustrated in FIG. 4. In this flow, in each step, some design variables are fixed while the other design variables are optimized to minimize the cost function; then in the next step, a different set of variables are fixed while the others are optimized to minimize the cost function. These steps are executed alternately until convergence or certain terminating conditions are met. As shown in the non-limiting example flowchart of FIG. 4, first, a design layout (step 402) is obtained, then a step of source optimization is executed in step 404, where all the design variables of the illumination source are optimized (SO) to minimize the cost function while all the other design variables are fixed. Then in the next step 406, a mask optimization (MO) is performed, where all the design variables of the patterning device are optimized to minimize the cost function while all the other design variables are fixed. These two steps are executed alternately, until certain terminating conditions are met in step 408. Various termination conditions can be used, such as, the value of the cost function becomes equal to a threshold value, the value of the cost function crosses the threshold value, the value of the cost function reaches within a preset error limit, or a preset number of iteration is reached, etc. Note that SO-MO-Alternate-Optimization is used as an example for the alternative flow. The alternate flow can take many different forms, such as SO-LO-MO-Alternate-Optimization, where SO, LO (Lens Optimization) is executed, and MO alternately and iteratively; or first SMO can be executed once, then execute LO and MO alternately and iteratively; and so on. Finally the output of the optimization result is obtained in step 410, and the process stops.

The pattern selection algorithm, as discussed before, may be integrated with the simultaneous or alternate optimization. For example, when an alternate optimization is adopted, first a full-chip SO can be performed, the 'hot spots' and/or 'warm spots' are identified, then an MO is performed. In view of the present disclosure numerous permutations and combinations of sub-optimizations are possible in order to achieve the desired optimization results.

Figure 5:
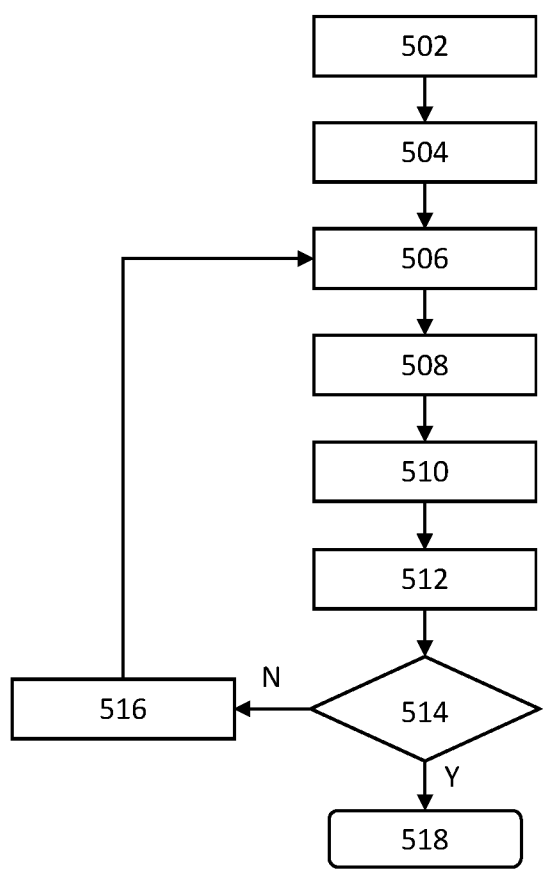
FIG. 5 shows one method of optimization, where a cost function is minimized.

FIG. 5 shows one method of optimization, where a cost function is minimized. In step 502, initial values of design variables are obtained, including their tuning ranges, if any. In step 504, the multi-variable cost function is set up. In step 506, the cost function is expanded within a small enough neighborhood around the starting point value of the design variables for the first iterative step (i=0). In step 508, standard multi-variable optimization techniques are applied to minimize the cost function. Note that the optimization can have constraints, such as tuning ranges, during the optimization process in 508 or at a later stage in the optimization process. Each iteration is done for the given test patterns (also known as "gauges") for the identified evaluation points that have been selected to optimize the lithographic process. In step 510, a lithographic response (e.g., certain characteristics of the aerial image, resist image, or certain characteristics of the lithographic process such as the process window) is predicted. In step 512, the result of step 510 is compared with a desired or ideal lithographic response value. If the termination condition is satisfied in step 514, i.e. the optimization generates a lithographic response value sufficiently close to the desired value, and then the final value of the design variables is outputted in step 518. The output step may also include outputting other functions using the final values of the design variables, such as outputting a wavefront aberration-adjusted map at the pupil plane (or other planes), an optimized source map, and optimized design layout etc. If the termination condition is not satisfied, then in step 516, the values of the design variables is updated with the result of the i-th iteration, and the process goes back to step 506. The process of FIG. 5 is elaborated in details below.

In an optimization process, no relationship between the design variables $(z_1, z_2, \ldots, z_N)$ and $f_p(z_1, z_2, \ldots, z_N)$ is assumed or approximated, except that $f_p(z_1, z_2, \ldots, z_N)$ is sufficiently smooth (e.g., first order derivatives $$\frac{\partial f_p(z_1, z_2, \ldots, z_N)}{\partial z_n}, (n = 1, 2, \ldots N) \text{exist}),$$

which is generally valid in a lithographic projection apparatus. An algorithm, such as the Gauss-Newton algorithm, the Levenberg-Marquardt algorithm, the gradient descent algorithm, simulated annealing, the genetic algorithm, can be applied to find $(\tilde{z}_1, \tilde{z}_2, \ldots, \tilde{z}_N)$.

Here, the Gauss-Newton algorithm is used as an example. The Gauss-Newton algorithm is an iterative method applicable to a general non-linear multi-variable optimization problem. In the i-th iteration wherein the design variables $(z_1, z_2, \ldots, z_N)$ take values of $(z_{1i}, z_{2i}, \ldots, z_{Ni})$, the Gauss-Newton algorithm linearizes $f_p(z_1, z_2, \ldots, z_N)$ in the vicinity of $(z_{1i}, z_{2i}, \ldots, z_{Ni})$, and then calculates values $(z_{1(i+1)}, z_{2(i+1)}, \ldots, z_{N(i+1)})$ in the vicinity of $(z_{1i}, z_{2i}, \ldots, z_{Ni})$ that give a minimum of $CF(z_1, z_2, \ldots, z_N)$. The design variables $(z_1, z_2, \ldots, z_N)$ take the values of $(z_{1(i+1)}, z_{2(i+1)}, \ldots, z_{N(i+1)})$ in the (i+1)-th iteration. This iteration continues until convergence (i.e. $CF(z_1, z_2, \ldots, z_N)$. does not reduce any further) or a preset number of iterations is reached.

Specifically, in the i-th iteration, in the vicinity of $(z_{1i}, z_{2i}, \ldots, z_{Ni})$, $$f_p(z_1, z_2, \ldots, z_N) \approx f_p(z_{1i}, z_{2i}, \ldots, z_{Ni}) + \sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} (z_n = z_{ni}) \quad \text{(Eq. 3)}$$

Under the approximation of Eq. 3, the cost function becomes:

$$CF(z_1, z_2, \ldots, z_N) \sum_{p=1}^{P} w_p f_p^2(z_1, z_2, \ldots, z_N) = \sum_{p=1}^{P} w_p \left( f_p(z_{1i}, z_{2i}, \ldots, z_{Ni}) + \sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} (z_n = z_{ni}) \right)^2 \quad \text{(Eq. 4)}$$

which is a quadratic function of the design variables $(z_1, z_2, \ldots, z_N)$. Every term is constant except the design variables $(z_1, z_2, \ldots, z_N)$.

If the design variables $(z_1, z_2, \ldots, z_N)$ are not under any constraints, $(z_{1(i+1)}, z_{2(i+1)}, \ldots, z_{N(i+1)})$ can be derived by solving by N linear equations:

$$\frac{\partial CF(z_1, z_2, \ldots, z_N)}{\partial z_n} = 0,$$

wherein $n = 1, 2, \ldots, N$.

If the design variables $(z_1, z_2, \ldots, z_N)$ are under the constraints in the form of J inequalities (e.g. tuning ranges of $(z_1, z_2, \ldots, z_N)$) $\sum_{n=1}^{N} A_{nj} z_n \leq B_j$, for $j=1, 2, \ldots, J$; and K equalities (e.g. interdependence between the design variables) $\sum_{n=1}^{N} C_{nk} z_n \leq D_k$, for $k=1, 2, \ldots, K$; the optimization process becomes a classic quadratic programming problem, wherein $A_{nj}, B_j, C_{nk}, D_k$ are constants. Additional constraints can be imposed for each iteration. For example, a "damping factor" $\Delta_D$, can be introduced to limit the difference between $(z_{1(i+1)}, z_{2(i+1)}, \ldots, z_{N(i+1)})$ and $(z_{1i}, z_{2i}, \ldots, z_{Ni})$, so that the approximation of Eq. 3 holds. Such constraints can be expressed as $z_{ni} - \Delta_D \leq z_n \leq z_{ni} + \Delta_D$. $(z_{1(i+1)}, z_{2(i+1)}, \ldots, z_{N(i+1)})$ can be derived using, for example, methods described in Numerical Optimization ($2^{nd}$ ed.) by Jorge Nocedal and Stephen J. Wright (Berlin New York: Vandenberghe. Cambridge University Press).

Instead of minimizing the RMS of $f_p(z_1, z_2, \ldots, z_N)$, the optimization process can minimize magnitude of the largest deviation (the worst defect) among the evaluation points to their intended values. In this approach, the cost function can alternatively be expressed as $$CF(z_1, z_2, \ldots, z_N) = \max_{1 \leq p \leq P} \frac{f_p(z_1, z_2, \ldots, z_N)}{CL_p}, \quad \text{(Eq. 5)}$$

wherein $CL_p$ is the maximum allowed value for $f_p(z_1, z_2, \ldots, z_N)$. This cost function represents the worst defect among the evaluation points. Optimization using this cost function minimizes magnitude of the worst defect. An iterative greedy algorithm can be used for this optimization.

The cost function of Eq. 5 can be approximated as:

$$CF(z_1, z_2, \ldots, z_N) = \sum_{p=1}^{P} w_p \left( \frac{f_p(z_1, z_2, \ldots, z_N)}{CL_p} \right)^q, \quad \text{(Eq. 6)}$$

wherein q is an even positive integer such as at least 4, preferably at least 10. Eq. 6 mimics the behavior of Eq. 5, while allowing the optimization to be executed analytically and accelerated by using methods such as the deepest descent method, the conjugate gradient method, etc.

Minimizing the worst defect size can also be combined with linearizing of $f_p(z_1, z_2, \ldots, z_N)$. Specifically, $f_p(z_1, z_2, \ldots, z_N)$ is approximated as in Eq. 3. Then the constraints on worst defect size are written as inequalities $E_{Lp} \leq f_p(z_1, z_2, \ldots, z_N) \leq E_{Up}$, wherein $E_{Lp}$ and $E_{Up}$, are two constants specifying the minimum and maximum allowed deviation for the $f_p(z_1, z_2, \ldots, z_N)$. Plugging Eq. 3 in, these constraints are transformed to, for $p=1, \ldots P$, $$\sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} z_n \leq E_{Up} + \sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} z_{ni} - f_p(z_{1i}, z_{2i}, \ldots, z_{Ni}) \quad \text{(Eq. 6')}$$

and $$-\sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} z_n \leq -E_{Up} - \sum_{n=1}^{N} \frac{\partial f_p(z_1, z_2, \ldots, z_N)}{\partial z_n}\bigg|_{z_1=z_{1i}, z_2=z_{2i}, \ldots z_N=z_{Ni}} z_{ni} + f_p(z_{1i}, z_{2i}, \ldots, z_{Ni}) \quad \text{(Eq. 6'')}$$

Since Eq. 3 is generally valid only in the vicinity of $(z_1, z_2, \ldots, z_N)$, in case the desired constraints $E_{Lp} \leq f_p(z_1, z_2, \ldots, z_N) \leq E_{Up}$ cannot be achieved in such vicinity, which can be determined by any conflict among the inequalities, the constants $E_{Lp}$ and $E_{Up}$ can be relaxed until the constraints are achievable. This optimization process minimizes the worst defect size in the vicinity of $(z_1, z_2, \ldots, z_N)$, i. Then each step reduces the worst defect size gradually, and each step is executed iteratively until certain terminating conditions are met. This will lead to optimal reduction of the worst defect size.

Another way to minimize the worst defect is to adjust the weight $w_p$ in each iteration. For example, after the i-th iteration, if the r-th evaluation point is the worst defect, $w_r$ can be increased in the (i+1)-th iteration so that the reduction of that evaluation point's defect size is given higher priority.

In addition, the cost functions in Eq. 4 and Eq. 5 can be modified by introducing a Lagrange multiplier to achieve compromise between the optimization on RMS of the defect size and the optimization on the worst defect size, i.e., $$CF(z_1, z_2, \ldots, z_N) = (1-\lambda)\sum_{p=1}^{P} w_p f_p^2(z_1, z_2, \ldots, z_N) + \lambda \max_{1 \leq p \leq P} \frac{f_p(z_1, z_2, \ldots, z_N)}{CL_p} \quad \text{(Eq. 6''')}$$

where $\lambda$ is a preset constant that specifies the trade-off between the optimization on RMS of the defect size and the optimization on the worst defect size. In particular, if $\lambda=0$, then this becomes Eq. 4 and the RMS of the defect size is only minimized; while if $\lambda=1$, then this becomes Eq. 5 and the worst defect size is only minimized; if $0<\lambda<1$, then both are taken into consideration in the optimization. Such optimization can be solved using multiple methods. For example, the weighting in each iteration may be adjusted, similar to the one described previously. Alternatively, similar to minimizing the worst defect size from inequalities, the inequalities of Eq. 6' and 6" can be viewed as constraints of the design variables during solution of the quadratic programming problem. Then, the bounds on the worst defect size can be relaxed incrementally or increase the weight for the worst defect size incrementally, compute the cost function value for every achievable worst defect size, and choose the design variable values that minimize the total cost function as the initial point for the next step. By doing this iteratively, the minimization of this new cost function can be achieved.

Optimizing a lithographic projection apparatus can expand the process window. A larger process window provides more flexibility in process design and chip design. The process window can be defined as a set of focus and dose values for which the resist image are within a certain limit of the design target of the resist image. Note that all the methods discussed here may also be extended to a generalized process window definition that can be established by different or additional base parameters in addition to exposure dose and defocus. These may include, but are not limited to, optical settings such as NA, sigma, aberrations, polarization, or optical constants of the resist layer. For example, as described earlier, if the PW also consists of different mask bias, then the optimization includes the minimization of MEEF (Mask Error Enhancement Factor), which is defined as the ratio between the substrate EPE and the induced mask edge bias. The process window defined on focus and dose values only serve as an example in this disclosure. A method of maximizing the process window, according to an embodiment, is described below.

In a first step, starting from a known condition ($f_0$, $\varepsilon_0$) in the process window, wherein $f_0$ is a nominal focus and $\varepsilon_0$ is a nominal dose, minimizing one of the cost functions below in the vicinity ($f_0 \pm \Delta f$, $\varepsilon_0 \pm \varepsilon$):

$$CF(z_1, z_2, \ldots, z_N, f_0, \varepsilon_0) = \max_{(f, \varepsilon)=(f_0 \pm \Delta f, \varepsilon_0 \pm \varepsilon)} \max_p |f_p(z_1, z_2, \ldots, z_N, f, \varepsilon)|. \quad \text{(Eq. 7)}$$

or $$CF(z_1, z_2, \ldots, z_N, f_0, \varepsilon_0) = \sum_{(f,\varepsilon)=(f_0 \pm \Delta f, \varepsilon_0 \pm \varepsilon)} \sum_p w_p f_p^2(z_1, z_2, \ldots, z_N, f, \varepsilon) \quad \text{(Eq. 7')}$$

or $$CF(z_1, z_2, \ldots, z_N, f_0, \varepsilon_0) = = \quad \text{(Eq. 7'')}$$
$$(1-\lambda)\sum_{(f,\varepsilon)=(f_0 \pm \Delta f, \varepsilon_0 \pm \varepsilon)} \sum_p w_p f_p^2(z_1, z_2, \ldots, z_N, f, \varepsilon) +$$
$$\lambda \max_{(f,\varepsilon)=(f_0 \pm \Delta f, \varepsilon_0 \pm \varepsilon)} \max_p |f_p(z_1, z_2, \ldots, z_N, f, \varepsilon)|$$

If the nominal focus $f_0$ and nominal dose $\varepsilon_0$ are allowed to shift, they can be optimized jointly with the design variables $(z_1, z_2, \ldots, z_N)$. In the next step, $(f_0 \pm \Delta f, \varepsilon_0 \pm \varepsilon)$ is accepted as part of the process window, if a set of values of $(z_1, z_2, \ldots, z_N, f, \varepsilon)$ can be found such that the cost function is within a preset limit.

Alternatively, if the focus and dose are not allowed to shift, the design variables $(z_1, z_2, \ldots, z_N)$ are optimized with the focus and dose fixed at the nominal focus $f_0$ and nominal dose $\varepsilon_0$. In an alternative embodiment, $(f_0 \pm \Delta f, \varepsilon_0 \pm \varepsilon)$ is accepted as part of the process window, if a set of values of $(z_1, z_2, \ldots, z_N)$ can be found such that the cost function is within a preset limit.

Figure 10:
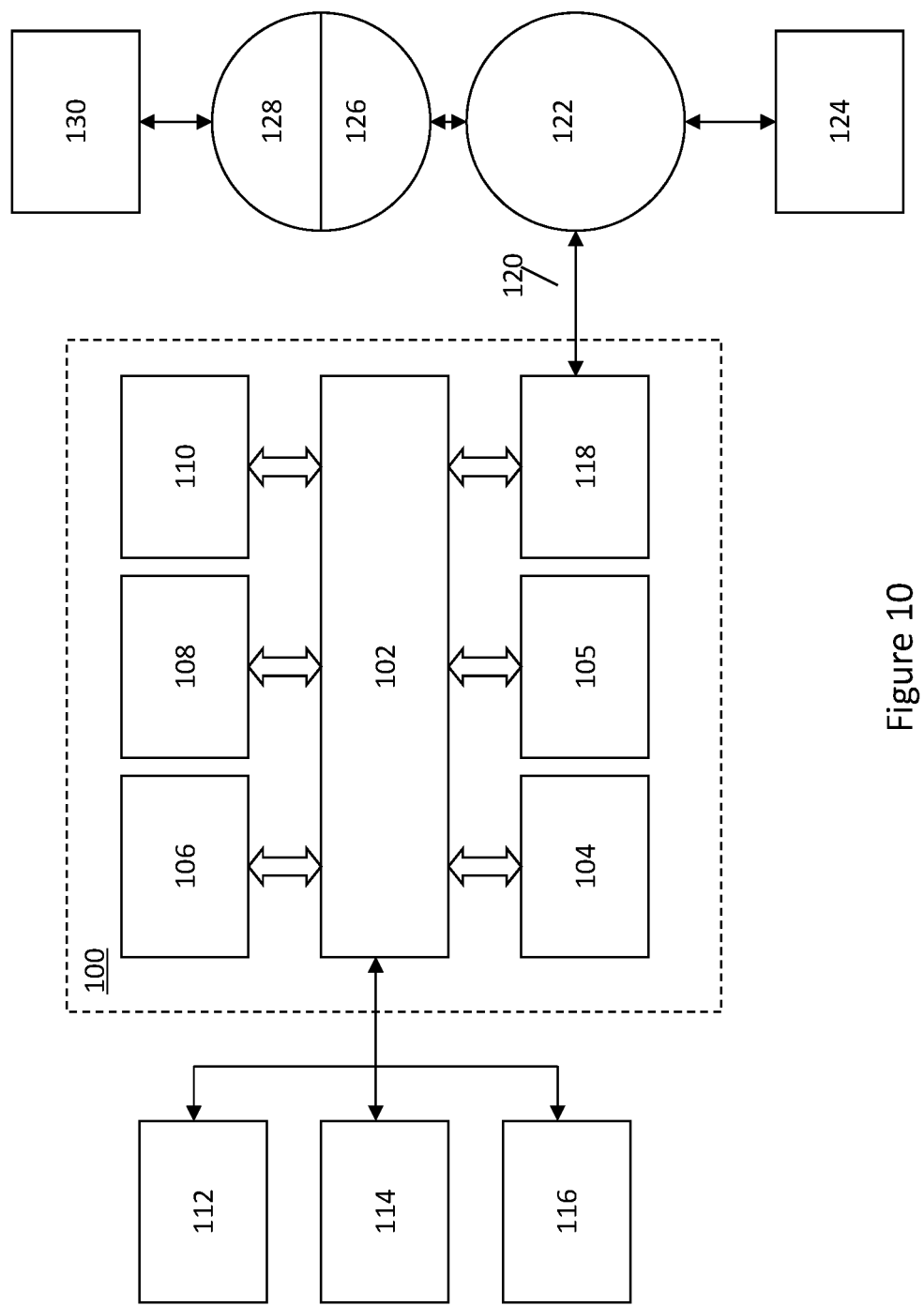
FIG. 10 is a block diagram of an example computer system in which embodiments can be implemented.

The methods described earlier in this disclosure can be used to minimize the respective cost functions of Eqs. 7, 7', or 7". If the design variables are characteristics of the projection optics, such as the Zernike coefficients, then minimizing the cost functions of Eqs. 7, 7', or 7" leads to process window maximization based on projection optics optimization, i.e., LO. If the design variables are characteristics of the source and patterning device in addition to those of the projection optics, then minimizing the cost function of Eqs. 7, 7', or 7" leads to process window maximizing based on SMLO, as illustrated in FIG. 10. If the design variables are characteristics of the source and patterning device and, then minimizing the cost functions of Eqs. 7, 7', or 7" leads to process window maximization based on SMO.

The optimization described above may be used to find a set of values of $(z_1, z_2, \ldots, z_N)$ to reduce many physical effects that may be adverse to the lithographic process. One such effect is variation in the etching process. In microfabrication, etching is a process that chemically removes portions of the substrate. The portions to be removed are exposed to etchant while the other portions are protected from etchant by a "masking" material which resists etching. In some situations, the masking material is a photoresist which has been patterned using photolithography. In other situations, nitrides, oxides, or metals may be suitable masking materials. The etchant may be liquid, gas, or plasma.

When the etchant is a liquid, the etching process is called wet etching. Commonly used liquid etchants include buffered HF, KOH, an aqueous solution of ethylene diamine and pyrocatechol, tetramethylammonium hydroxide (TMAH), etc. For example, the substrate may be immersed in a bath of liquid etchant with agitation. Some liquid etchants etch crystalline materials at very different rates depending upon which crystal face is being etched. When these liquid etchants are used, the etching process is called anisotropic wet etching.

When the etchant includes plasma, the etching process is called plasma etching. Plasma etching may operate at a low pressure (e.g., 0.1-5 Torr). Plasma etching may use electrically neutral free radicals to react with exposed portions of the substrate. Etching by electrically neutral free radicals is usually isotropic. Plasma etching may also use ions to react with exposed portions of the substrate. Because ions are electrically charged, they can be directed at selected directions by electric or magnetic fields, thereby causing anisotropic etching.

Figure 6:
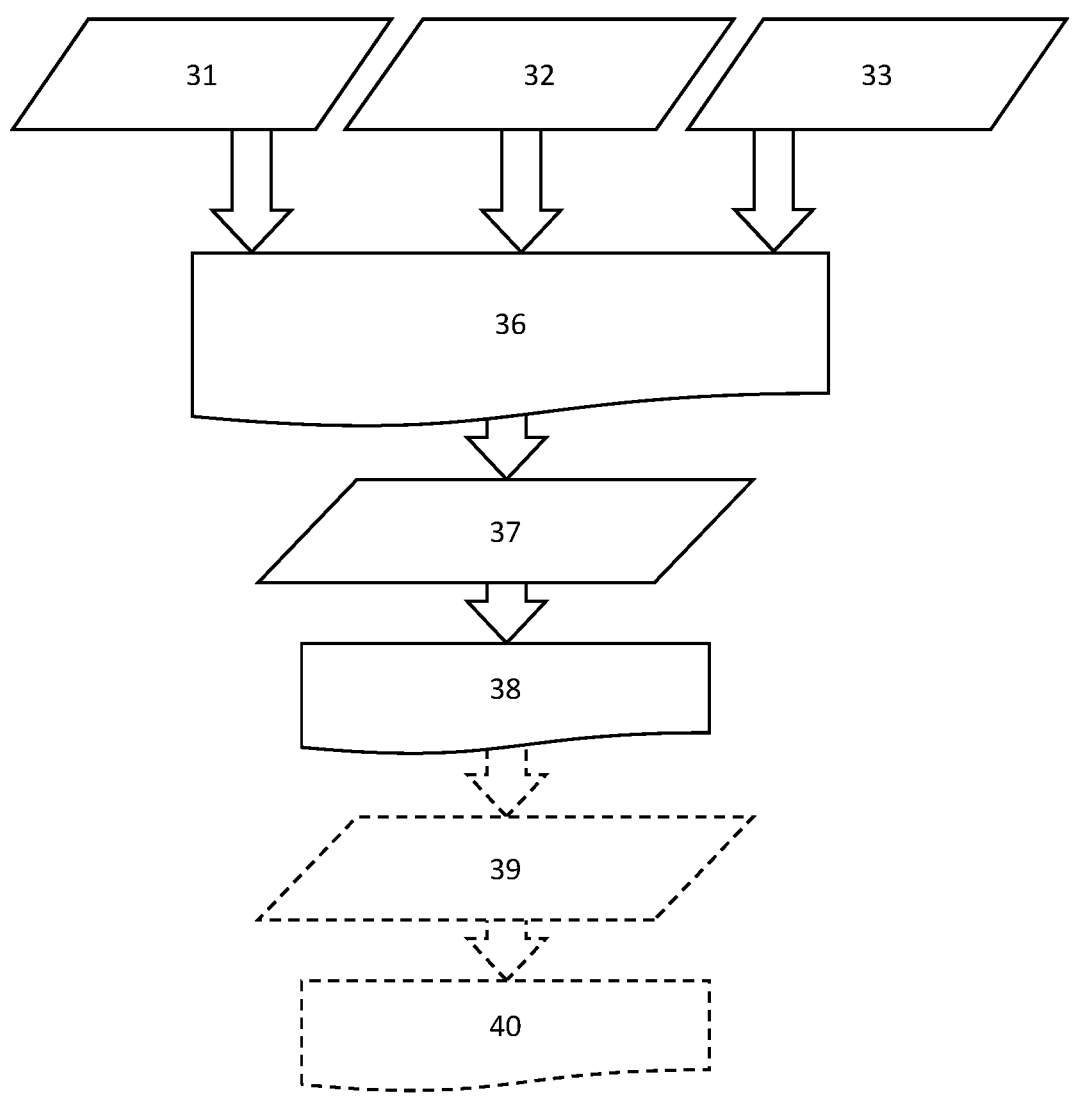
FIG. 6 is a block diagram of simulation models that include simulating an etched image from a resist image using an etching model.

Ideally, simulating lithography in a lithographic projection apparatus would be able to include simulating an etching process. For example, as illustrated in FIG. 6, the flow chart in FIG. 2 may include simulating an etched image 40 from the resist image 38 using an etching model 39. The etched image 40 includes features transferred to the substrate by the etching process using the features of the resist image 38 as masks.

However, a wet etching process may be affected by many parameters, some of them may be difficult to control or monitor and some may change during etching. These parameters may include concentration of the etchant, temperature of the etchant, agitation amplitude and frequency, relative amount of etchant to the size of the portions to be etched, and age of the etchant. A plasma etching process may also be affected by many parameters, some of them may be difficult to control or monitor and some may change during etching. These parameters may include concentration of the plasma, chemical composition of the plasma, flow rate and direction of the gas to form the plasma, flow rate and direction of carrying gas, details in the electric or magnetic fields, physical dimensions and chemical compositions of components of a plasma etching chamber.

Therefore, modeling an etching process is a challenge and the etching process often have uncontrolled variations over time and between batch to batch. It is difficult to predict or simulate a feature etched into the substrate from a corresponding feature in the resist image.

The variations in the etching processes also stem from the fact that etching generally does not exactly transfer a pattern in the masking materials (e.g., an opening, also called a feature, in a resist image) onto the substrate. For example, etchant may undercut the masking material, i.e., some portions of the substrate not directly exposed but close to exposed options are removed by the etchant. For example, etched features may become narrower at a greater depth into a substrate.

One approach to accommodate the variations in the etching process (or multiple etching processes) is adjusting an evaluation point of the lithographic process for each variation or each of the multiple. For example, one such evaluation point is a point on a feature in the resist or aerial image. Adjusting the point may be by biasing the feature. For example, the feature may be made slightly smaller for an etching process that undercuts than for an etch process that does not undercut. The amount of biasing may be feature-dependent. Another example of the evaluation point is the dose. For example, a smaller dose in a dark field lithographic processing using a positive tone resist (or a larger dose in a bright field lithographic processing using a negative tone resist) may be used for an etching process that undercuts than for an etch process that does not undercut. Accommodating the variations of the etching process by adjusting an evaluation point can have a ripple effect. Namely, processes upstream to the etching process may have to be changed. For example, characteristics of the projection optics, the source, the dose, the resist recipe, the development and baking of the resist, and even the features on the patterning device may have to be adjusted, for example, to make the biased features or to achieve the adjusted dose. Such adjustment can be quite time consuming. When the etching process varies, these characteristics may have to be readjusted.

The lithographic projection apparatus and the lithographic process may be made more tolerant to variations of the etching process through an optimization, thereby reducing or eliminating the need of repeated adjustment. For example, adjusting design variables related to the source can be quite time consuming. If a set of values of these design variables can be found that can tolerate the variations in the etching process, these design variables may not have to be readjusted when the variations in the etching process occur.

Figure 7:
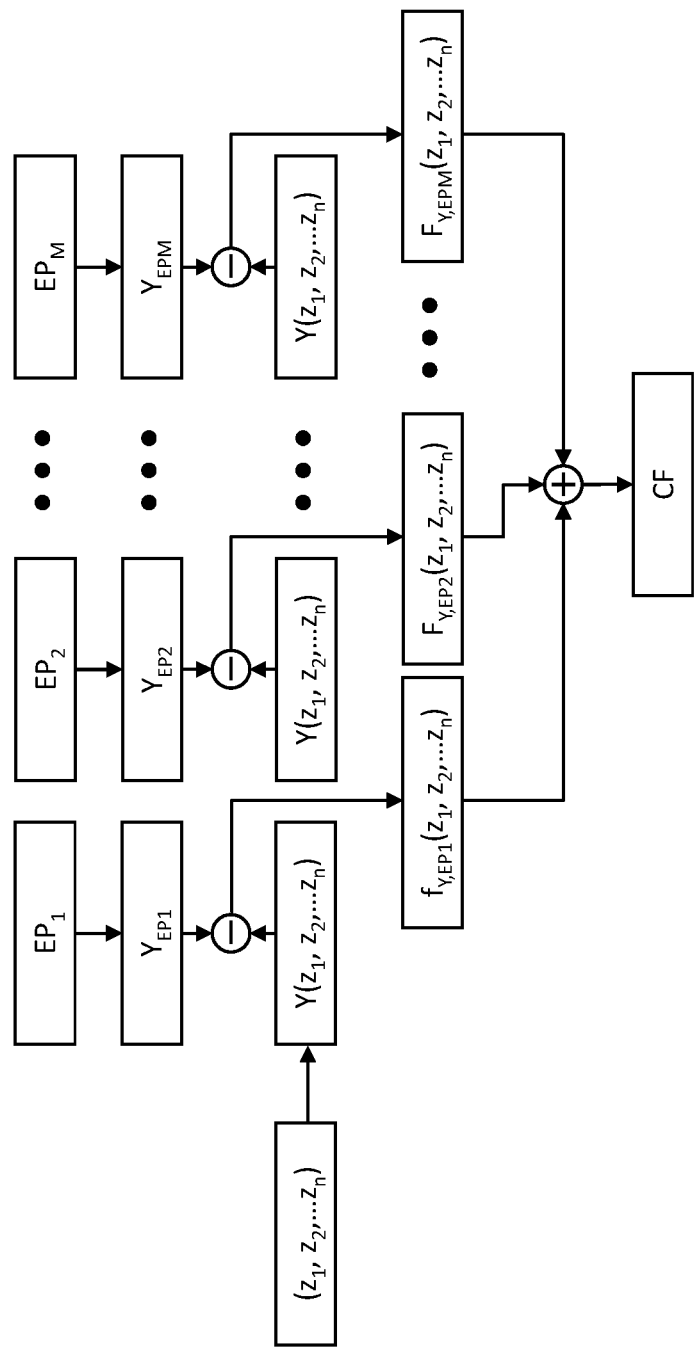
FIG. 7 shows a cost function that is a function of deviations of the evaluation points adjusted for variations of the etching process.

According to an embodiment, the optimization may follow the flows of FIG. 3, FIG. 4 and FIG. 5, and use a cost function that is a function of deviations of the evaluation points adjusted for variations of the etching process (i.e., the partial derivative of the cost function with respect to each of the metrics is not always zero). FIG. 7 shows an example of such a cost function. As explained above, accommodating variations ($EP_1$, $EP_2$, ..., $EP_M$) of the etching process may include determining the values of at least one evaluation point Y as a set of values of ($Y_{EP1}$, $Y_{EP2}$, ..., $Y_{EPM}$) for each of the variations ($EP_1$, $EP_2$, ..., $EP_M$) respectively. Two different members of the set ($Y_{EP1}$, $Y_{EP2}$, ..., $Y_{EPM}$) are usually not identical. Of course, the evaluation point Y cannot have multiple different values like those in the set ($Y_{EP1}$, $Y_{EP2}$, ..., $Y_{EPM}$) at the same time. The value of the evaluation point Y is generally a function of the design variables ($z_1$, $z_2$, ..., $z_N$). At any single point of time, the simulated or actual value of the evaluation point may be written as $Y(z_1, z_2, ..., z_N)$. Therefore, the deviations from the values of evaluation point determined for variations of the etching process may be written as $f_{Y,EPv}(z_1, z_2, ..., z_N)$, where v=1, ..., M. One simple example of $f_{Y,EPv}(z_1, z_2, ..., z_N)$ is $Y(z_1, z_2, ..., z_N) - Y_{EPv})^2$. Other simple examples of $f_{Y,EPv}(z_1, z_2, ..., z_N)$ may include $(Y(z_1, z_2, ..., z_N) - Y_{EPv})^2$ and $|Y(z_1, z_2, ..., z_N) - Y_{EPv}|$. The deviations are not limited to these examples. The cost function may be a function of each of $f_{Y,EPv}(z_1, z_2, ..., z_N)$, where v=1, ..., M. For example, $CF(z_1, z_2, ..., z_N) = \sum_{v=1}^{M} \sum_{p=1}^{P} w_p f_{p,EPv}^2(z_1, z_2, ..., z_N)$.

Figure 8:
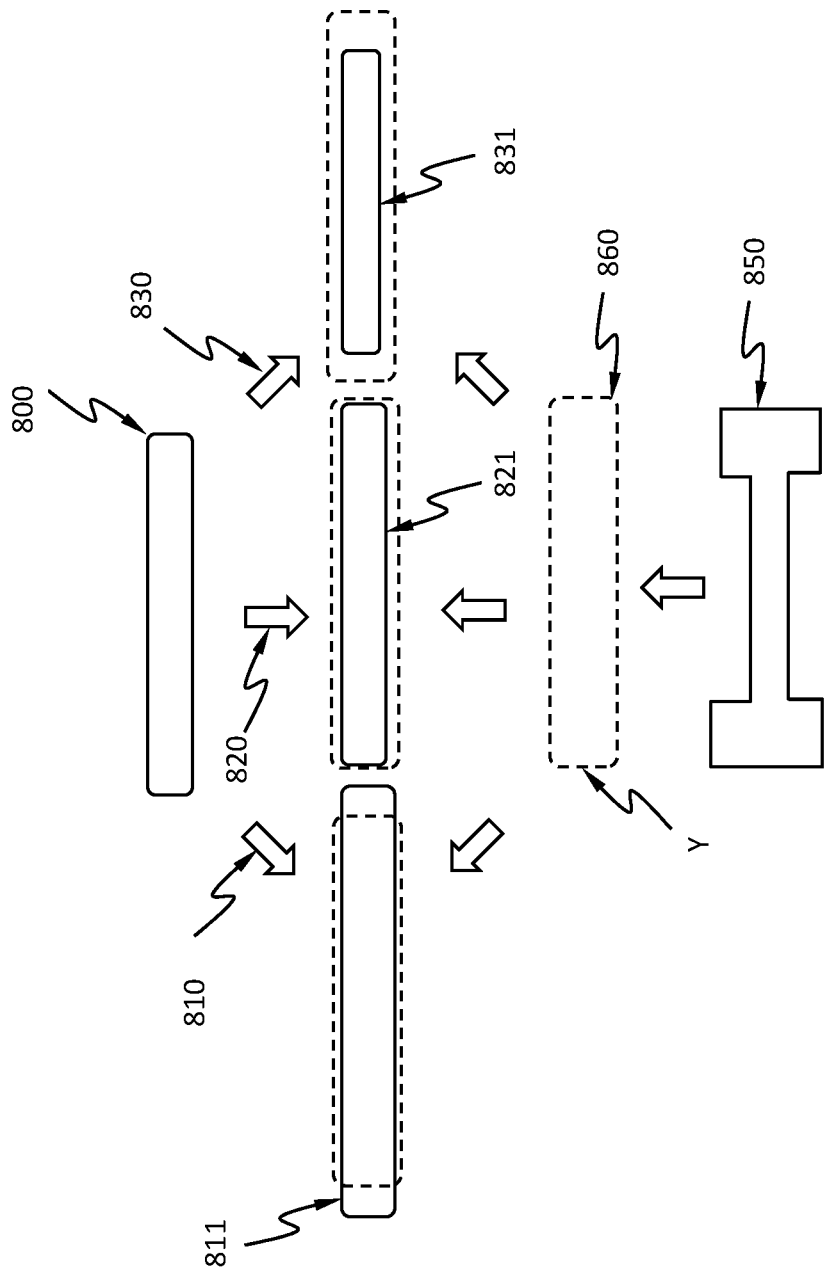
FIG. 8 shows an example of the cost function of FIG. 7.

FIG. 8 shows an example of such a cost function. Different biases under three different etching processes 810, 820 and 830 may be required to make the same etched feature 800. Namely M=3. Under these different biases, the corresponding features on the resist image may have different shapes, such as 811, 821 and 831, respectively. A corresponding pattern 850 on the patterning device in one lithographic process leads to a pattern in the resist image with a shape 860, which could be simulated using the flow in FIG. 2. The edge placement errors at one point Y on the pattern between the shape 860 and each of the shapes 811, 821 and 831, respectively, are three deviations $f_{Y,EPv}(z_1, z_2, ..., z_N)$, where v=1, 2 or, 3. Therefore, the cost function may be a function of EPEs between the shape 860 and each of the shapes 811, 821 and 831. Of course, $f_{Y,EPv}(z_1, z_2, ..., z_N)$, are not limited to EPEs. Although the evaluation point is shown as a point on the design layout in this example, the evaluation point may not be connected to the design layout. For example, the evaluation point may be dose, focus, throughput, process window, critical dimension, resist contour distance, worst defect size, or best focus shift.

Figure 9A:
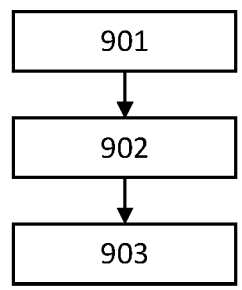
FIG. 9A illustrates a method according to an embodiment.

FIG. 9A illustrates a method according to an embodiment. In step 901, a value of at least one evaluation point of the lithographic process is determined for each variation of the etching process. In step 902, a multi-variable cost function of the design variables are calculated. The multi-variable cost function is a function of a deviation from the determined values of the at least one evaluation point. In step, 903, the design variables are adjusted following of the optimization methods of FIGS. 3-5.

Figure 9B:
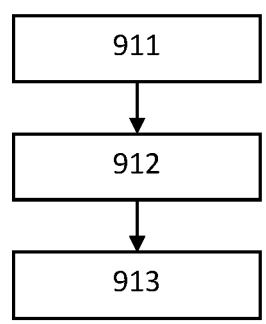
FIG. 9B illustrates a method according to an embodiment.

FIG. 9B illustrates a method according to an embodiment. In step 911, a value of at least one evaluation point of the lithographic process is determined for each variation of the etching process. In step 912, a multi-variable cost function of the design variables are calculated. The multi-variable cost function is a function of a deviation from the determined values of the at least one evaluation point. The design variables include the at least one evaluation point. In step, 913, the design variables are adjusted following of the optimization methods of FIGS. 3-5.

In one embodiment, the design variables $(z_1, z_2, \ldots, z_N)$ may include some or all of the evaluation points, the values of which are determined for the variations of the etching process, or functions of these evaluation points. The evaluation points may include characteristics of the projection optics, the source, the dose, the resist recipe, the development and baking of the resist, and the features on the patterning device. For example, the design variables $(z_1, z_2, \ldots, z_N)$ may include the biases to the patterns on the resist image. Using such a cost function in the optimization leads to values of the evaluation points, which may be used to design the etching process. For example, if the etching process includes characteristics that may be adjusted and whose variation may be reliably modeled, a partial etching model may be constructed even if it does not describe all aspects of the etching process. Including at some of these characteristics into the design variables $(z_1, z_2, \ldots, z_N)$ allows co-optimizing these characteristics with other characteristics (e.g., those of the source, the projection optics and/or the patterning device), which may lead to better performance of the lithographic process and the etching process, such as larger process window.

FIG. 10 is a block diagram that illustrates a computer system 100 which can assist in implementing the optimization methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with one or more embodiments, one such downloaded application provides for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 11:
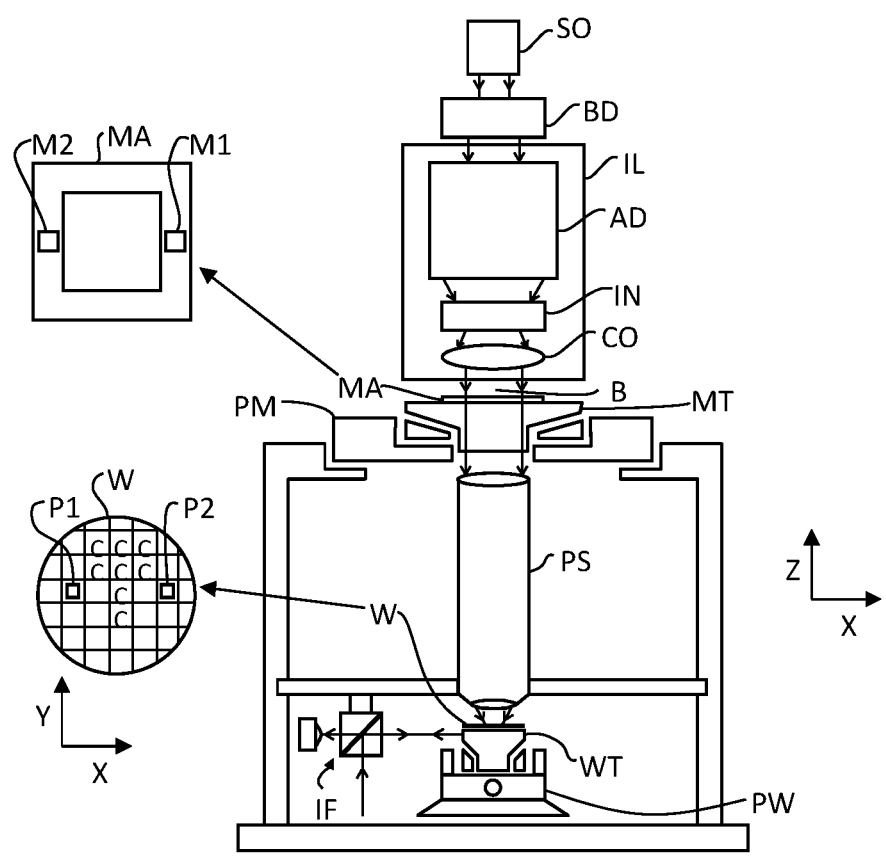
FIG. 11 is a schematic diagram of a lithographic projection apparatus to which embodiments are applicable.

FIG. 11 schematically depicts a lithographic projection apparatus whose illumination source could be optimized utilizing the methods described herein. The apparatus comprises:

a radiation system IL, to supply a projection beam B of radiation. In this particular case, the radiation system also comprises a radiation source SO;

a first object table (e.g., mask table) MT comprising a holder configured to hold a patterning device MA (e.g., a mask or a reticle), and connected to a first positioner to accurately position the patterning device with respect to item PS;

a second object table (substrate table) WT comprising a substrate holder to hold a substrate W (e.g., a resist-coated silicon wafer), and connected to a second positioner to accurately position the substrate with respect to item PS; and a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective patterning device). Alternatively, the apparatus may employ another kind of patterning device as an alternative to the use of a mask; examples include a programmable mirror array or LCD matrix.

The source SO (e.g., a mercury lamp or excimer laser) produces a beam of radiation. This beam is fed into an illumination system (illuminator) IL, either directly or after having traversed a conditioner, such as a beam expander Ex, for example. The illuminator IL may comprise an adjuster AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 11 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioner (and interferometric measuring device IF), the substrate table WT can be moved accurately, e.g. so as to position different target portions C in the path of the beam PB. Similarly, the first positioner can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 10. However, in the case of a wafer stepper (as opposed to a step-and-scan tool) the patterning device table MT may just be connected to a short stroke actuator, or may be fixed.

The depicted tool can be used in two different modes:

In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;

In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

The concepts disclosed herein may simulate or mathematically model any generic imaging system for imaging sub wavelength features, and may be especially useful with emerging imaging technologies capable of producing wavelengths of an increasingly smaller size. Emerging technologies already in use include EUV (extreme ultra violet) lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

The invention may further be described using the following clauses:
1. A computer-implemented method to improve a lithographic process for imaging a portion of a design layout onto a substrate using a lithographic projection apparatus and for transferring the imaged portion of the design layout to the substrate by an etching process, the method comprising:

determining a value of at least one evaluation point of the lithographic process for each of a plurality of variations of the etching process;

computing a multi-variable cost function of a plurality of design variables that are characteristics of the lithographic process, wherein the multi-variable cost function is a function of a deviation from the determined values of the at least one evaluation point; and reconfiguring the characteristics of the lithographic process by adjusting the design variables until a termination condition is satisfied.

2. The method of clause 1, wherein the deviation is a function of the design variables.
3. The method of any of clauses 1 to 2, wherein the deviation is a function of a difference between an actual or simulated value of the at least one evaluation point and the determined value of the at least one evaluation point.
4. The method of any of clauses 1 to 3, wherein the evaluation point is selected from a point on a resist image or an aerial image or the design layout, dose, focus, throughput, process window, critical dimension, resist contour distance, worst defect size, and best focus shift.
5. The method of any of clauses 1 to 4, wherein the deviation is an edge placement error.
6. The method of any of clauses 1 to 5, wherein at least some of the design variables are characteristics of an illumination source, a design layout, projection optics, or a combination thereof.
7. The method of any of clauses 1 to 6, wherein the portion of the design layout comprises one or more selected from: an entire design layout, a clip, a section of a design layout that is known to have a critical feature, and a section of the design layout where a critical feature has been identified by a pattern selection method.
8. The method of any of clauses 1 to 7, wherein the termination condition includes one or more selected from: minimization of the cost function; maximization of the cost function; reaching a preset number of iterations; reaching a value of the cost function equal to or beyond a preset threshold value; reaching a computation time; and reaching a value of the cost function within an acceptable error limit.
9. The method of any of clauses 1 to 8, wherein iterative reconfiguration is performed without constraints or with constraints dictating the range of at least some of the design variables.
10. The method of clause 9, wherein the constraint includes one or more selected from: a tuning range, a rule governing patterning device manufacturability, and interdependence between the design variables.
11. The method of any of clauses 1 to 10, wherein determining the value of the at least one evaluation point comprises determining a bias of a pattern in the portion of the design layout.
12. The method of any of clauses 1 to 11, wherein the design layout comprises an assist feature, and wherein the assist feature comprises a SRAF (Sub Resolution Assist Feature) and/or PRAF (Printable Resolution Assist Feature).
13. A computer-implemented method to improve a lithographic process for imaging a portion of a design layout onto a substrate using a lithographic projection apparatus and for transferring the imaged portion of the design layout to the substrate by an etching process, the method comprising:

determining a value of at least one evaluation point of the lithographic process for each of a plurality of variations of the etching process;

computing a multi-variable cost function of a plurality of design variables that are characteristics of the lithographic process, wherein the multi-variable cost function is a function of a deviation from the determined values of the at least one evaluation point, wherein the plurality of design variables comprise the at least one evaluation point; and reconfiguring the characteristics of the lithographic process by adjusting the design variables until a termination condition is satisfied.

14. The method of clause 13, wherein the evaluation point is selected from a point on a resist image or an aerial image or the design layout, dose, focus, throughput, process window, critical dimension, resist contour distance, worst defect size, and best focus shift.
15. The method of any of clauses 13 to 14, wherein at least some of the design variables are characteristics of an illumination source, a design layout, projection optics, or a combination thereof.
16. The method of any of clauses 13 to 15, wherein the portion of the design layout comprises one or more selected from: an entire design layout, a clip, a section of a design layout that is known to have a critical feature, and a section of the design layout where a critical feature has been identified by a pattern selection method.
17. The method of any of clauses 13 to 16, wherein the termination condition includes one or more selected from: minimization of the cost function; maximization of the cost function; reaching a preset number of iterations; reaching a value of the cost function equal to or beyond a preset threshold value; reaching a computation time; and reaching a value of the cost function within an acceptable error limit.
18. The method of any of clauses 13 to 17, wherein iterative reconfiguration is performed without constraints or with constraints dictating the range of at least some of the design variables.
19. The method of clause 18, wherein the constraint includes one or more selected from: a tuning range, a rule governing patterning device manufacturability, and interdependence between the design variables.
20. The method of any of clauses 13 to 19, wherein determining the value of the at least one evaluation point comprises determining a bias of a pattern in the portion of the design layout.
21. The method of any of clauses 13 to 20, wherein the design layout comprises an assist feature, and wherein the assist feature comprises a SRAF (Sub Resolution Assist Feature) and/or PRAF (Printable Resolution Assist Feature).
22. A computer program product comprising a computer readable medium having instructions recorded thereon, the instructions when executed by a computer implementing the method of any of the above clauses.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

Aspects of the invention can be implemented in any convenient form. For example, an embodiment may be implemented by one or more appropriate computer programs which may be carried on an appropriate carrier medium which may be a tangible carrier medium (e.g. a disk) or an intangible carrier medium (e.g. a communications signal). Embodiments of the invention may be implemented using suitable apparatus which may specifically take the form of a programmable computer running a computer program arranged to implement a method as described herein.

The descriptions above are intended to be illustrative, not limiting. Thus, it will be apparent to one skilled in the art that modifications may be made to the embodiments as described without departing from the scope of the claims set out below.

What is claimed is:

1. A method to improve a lithographic process for imaging a portion of a design layout onto a substrate using a lithographic projection apparatus and for transferring the imaged portion of the design layout to the substrate by an etching process, the method comprising:
   evaluating, by a hardware computer system, one or more design variables that are characteristics of the lithographic process with respect to variation of the etching process to identify one or more values of the one or more design variables tolerant to etching process variation;
   computing, by the hardware computer system, a multi-variable cost function of a plurality of design variables that are characteristics of the lithographic process, wherein the plurality of design variables of the cost function are other than the one or more design variables tolerant to etching process variation; and
   reconfiguring one or more of the characteristics of the lithographic process by adjusting one or more of the design variables of the cost function and re-evaluating the cost function, until a termination condition for the cost function is satisfied.

2. The method of claim 1, wherein the evaluating comprises determining a value of an evaluation point of the lithographic process for each of a plurality of variations of the etching process and wherein the evaluation point is selected from: a point of a resist image or of an aerial image or of the design layout, dose, focus, throughput, process window, critical dimension, resist contour distance, worst defect size, or best focus shift.

3. The method of claim 2, wherein the evaluating further comprises evaluating a function of a deviation from the determined values of the evaluation point.

4. The method of claim 1, wherein at least one of the design variables is a characteristic of an illumination of a patterning device, the design layout, projection optics, or a combination thereof.

5. The method of claim 1, wherein iterative reconfiguration is performed with a constraint dictating a range of at least one of the design variables.

6. The method of claim 5, wherein the constraint includes one or more selected from: a tuning range, a rule governing patterning device manufacturability, or interdependence between the design variables.

7. The method of claim 1, wherein the design layout comprises an assist feature, and wherein the assist feature comprises a sub-resolution assist feature.

8. A computer program product comprising a non-transitory computer-readable medium having instructions therein, the instructions, upon execution by a computer system, configured to cause the computer system to at least:
   for a lithographic process for imaging a portion of a design layout onto a substrate using a lithographic projection apparatus and for transferring the imaged portion of the design layout to the substrate by an etching process, evaluate, by a hardware computer system, one or more design variables that are characteristics of the lithographic process with respect to variation of the etching process to identify one or more values of the one or more design variables tolerant to etching process variation;
   compute, by the hardware computer system, a multi-variable cost function of a plurality of design variables that are characteristics of the lithographic process, wherein the plurality of design variables of the cost function is other than the one or more design variables tolerant to etching process variation; and
   reconfigure one or more of the characteristics of the lithographic process by adjusting one or more of the design variables of the cost function and re-evaluating the cost function, until a termination condition for the cost function is satisfied.

9. The computer program product of claim 8, wherein the instructions configured to cause the computer system to evaluate one or more design variables are further configured to cause the computer system to determine a value of an evaluation point of the lithographic process for each of a plurality of variations of the etching process.

10. The computer program product of claim 9, wherein the evaluation point is selected from: a point of a resist image or of an aerial image or of the design layout, dose, focus, throughput, process window, critical dimension, resist contour distance, worst defect size, or best focus shift.

11. The computer program product of claim 9, wherein the instructions configured to cause the computer system to evaluate one or more design variables are further configured to cause the computer system to evaluate a function of a deviation from the determined values of the evaluation point.

12. The computer program product of claim 8, wherein at least one of the design variables is a characteristic of an illumination of a patterning device, the design layout, projection optics, or a combination thereof.

13. The computer program product of claim 8, wherein iterative reconfiguration is performed with a constraint dictating a range of at least one of the design variables, the constraint including one or more selected from: a tuning range, a rule governing patterning device manufacturability, or interdependence between the design variables.

14. The computer program product of claim 8, wherein the design layout comprises an assist feature, and wherein the assist feature comprises a sub-resolution assist feature.

15. A computer program product comprising a non-transitory computer-readable medium having instructions therein, the instructions, upon execution by a computer system, configured to cause the computer system to at least:
   for a lithographic process involving an imaging process for imaging a portion of a design layout onto a substrate using a lithographic projection apparatus and an etching process for transferring the imaged portion of the design layout to the substrate, compute a multi-variable cost function of a plurality of design variables that are characteristics of the imaging process, wherein the multi-variable cost function is a function of a value for an evaluation point for the imaging process for each of a plurality of variations of the etching process; and
   reconfigure one or more of the characteristics of the lithographic process by adjusting one or more of the design variables and re-evaluating the cost function, until a termination condition for the cost function is satisfied.

16. The computer program product of claim 15, wherein the evaluation point is selected from: a point of a resist image, of an aerial image or of the design layout, dose, focus, throughput, process window, critical dimension, resist contour distance, worst defect size, or best focus shift.

17. The computer program product of claim 15, wherein the multi-variable cost function is a function of a deviation of the value for the evaluation point for each of the plurality of variations of the etching process.

18. The computer program product of claim 17, wherein the deviation is a function of a difference between an actual or simulated value of the evaluation point and a determined value of the evaluation point for a variation of the etching process.

19. The computer program product of claim 17, wherein the deviation comprises an edge placement error.

20. The computer program product of claim 15, wherein the variations of the etching process comprise spatial biases of one or more features of the design layout.

21. A computer program product comprising a non-transitory computer-readable medium having instructions therein, the instructions, upon execution by a computer system, configured to cause the computer system to at least:

for a lithographic process involving an imaging process for imaging a portion of a design layout onto a substrate using a lithographic projection apparatus and an etching process for transferring the imaged portion of the design layout to the substrate, compute a multi-variable cost function of a plurality of design variables that are characteristics of the imaging process, wherein the multi-variable cost function is function of an illumination variable, a design layout variable and an etching process variable and the multi-variable cost function co-optimizes at least the illumination, design layout and etching process variables subject to at least etching process variation; and reconfigure one or more of the characteristics of the lithographic process by adjusting one or more of the design variables and re-evaluating the cost function, until a termination condition for the cost function is satisfied.

22. The computer program product of claim 21, wherein the multi-variable cost function is a function of a value for an evaluation point for the imaging process for each of a plurality of variations of the etching process.

23. The computer program product of claim 22, wherein the evaluation point is selected from: a point of a resist image, of an aerial image or of the design layout, dose, focus, throughput, process window, critical dimension, resist contour distance, worst defect size, or best focus shift.

24. The computer program product of claim 22, wherein the multi-variable cost function is a function of a deviation of the value for the evaluation point for each of the plurality of variations of the etching process.

25. The computer program product of claim 21, wherein the etching process variation comprise spatial biases of one or more features of the design layout.

* * * * *